US012265484B2

(12) United States Patent
Kazakov

(10) Patent No.: US 12,265,484 B2
(45) Date of Patent: Apr. 1, 2025

(54) PROCESSING DEVICE AND METHOD OF SHARING STORAGE BETWEEN CACHE MEMORY, LOCAL DATA STORAGE AND REGISTER FILES

(71) Applicant: Advanced Micro Devices, Inc., Santa Clara, CA (US)

(72) Inventor: Maxim V. Kazakov, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/467,104

(22) Filed: Sep. 3, 2021

(65) Prior Publication Data
US 2023/0069890 A1 Mar. 9, 2023

(51) Int. Cl.
| | |
|---|---|
| *G06F 13/16* | (2006.01) |
| *G06F 9/30* | (2018.01) |
| *G06F 9/38* | (2018.01) |
| *G06F 12/0875* | (2016.01) |

(52) U.S. Cl.
CPC ...... *G06F 13/1668* (2013.01); *G06F 9/30098* (2013.01); *G06F 9/3887* (2013.01); *G06F 9/3888* (2023.08); *G06F 12/0875* (2013.01); *G06F 2212/452* (2013.01)

(58) Field of Classification Search
CPC ............. G06F 13/1668; G06F 9/30098; G06F 9/3887; G06F 12/0875
USPC ........................................................ 710/107
See application file for complete search history.

(56) References Cited

U.S. PATENT DOCUMENTS

| | | | |
|---|---|---|---|
| 5,564,031 A * | 10/1996 | Amerson | G06F 9/30134 712/E9.027 |
| 2007/0130447 A1 | 6/2007 | Coon et al. | |
| 2008/0270736 A1* | 10/2008 | Nishida | G06F 12/08 711/E12.016 |
| 2012/0246657 A1* | 9/2012 | Abdallah | G06F 9/3851 718/102 |
| 2013/0151787 A1 | 6/2013 | Riguer et al. | |
| 2014/0189191 A1* | 7/2014 | Pardo | G06F 12/0802 711/3 |
| 2014/0204687 A1* | 7/2014 | Sinangil | G11C 11/419 365/189.11 |
| 2014/0373022 A1* | 12/2014 | Chan | G06F 9/3856 718/103 |

(Continued)

FOREIGN PATENT DOCUMENTS

KR 10-2013-0127418 A 11/2013

*Primary Examiner* — Chun Kuan Lee
(74) *Attorney, Agent, or Firm* — Volpe Koenig

(57) ABSTRACT

An accelerated processing device is provided which comprises a plurality of compute units each including a plurality of SIMD units, and each SIMD unit comprises a register file. The accelerated processing device also comprises LDS in communication with each of the SIMD units. The accelerated processing device also comprises a first portion of cache memory, in communication with each of the SIMD units and a second cache portion of memory shared by the compute units. The compute units are configured to execute a program in which a storage portion of at least one of the register file of a SIMD unit, the first portion of cache memory and the LDS is reserved as part of another of the register file, the first portion of cache memory and the LDS.

16 Claims, 5 Drawing Sheets

(56) References Cited

U.S. PATENT DOCUMENTS

| | | | |
|---|---|---|---|
| 2015/0154022 A1* | 6/2015 | Khot | G06F 9/3888 |
| | | | 712/217 |
| 2015/0212819 A1* | 7/2015 | Giroux | G06F 9/3853 |
| | | | 712/244 |
| 2017/0177350 A1 | 6/2017 | Ould-Ahmed-Vall | |
| 2017/0212757 A1 | 7/2017 | Mantor et al. | |
| 2018/0004670 A1* | 1/2018 | Sudhir | G06F 12/0875 |
| 2018/0300139 A1* | 10/2018 | Que | G06F 9/3867 |
| 2020/0184002 A1* | 6/2020 | Sakharshete | G06N 3/08 |
| 2020/0371935 A1* | 11/2020 | Chachad | G06F 9/4498 |

* cited by examiner

PROCESSING DEVICE AND METHOD OF SHARING STORAGE BETWEEN CACHE MEMORY, LOCAL DATA STORAGE AND REGISTER FILES

BACKGROUND

Accelerated processing devices (APDs), such as graphical processing units (GPUs), artificial intelligence processors and compute processors, are used to accelerate the processing of operations (e.g., graphics operations) which are well suited for parallel processing. GPUs include a plurality processor cores (e.g., compute units (CUs)) which perform operations in a parallel manner according to a single-instruction-multiple-data (SIMD) paradigm.

BRIEF DESCRIPTION OF THE DRAWINGS

A more detailed understanding can be had from the following description, given by way of example in conjunction with the accompanying drawings wherein.

DETAILED DESCRIPTION

Figure 1:
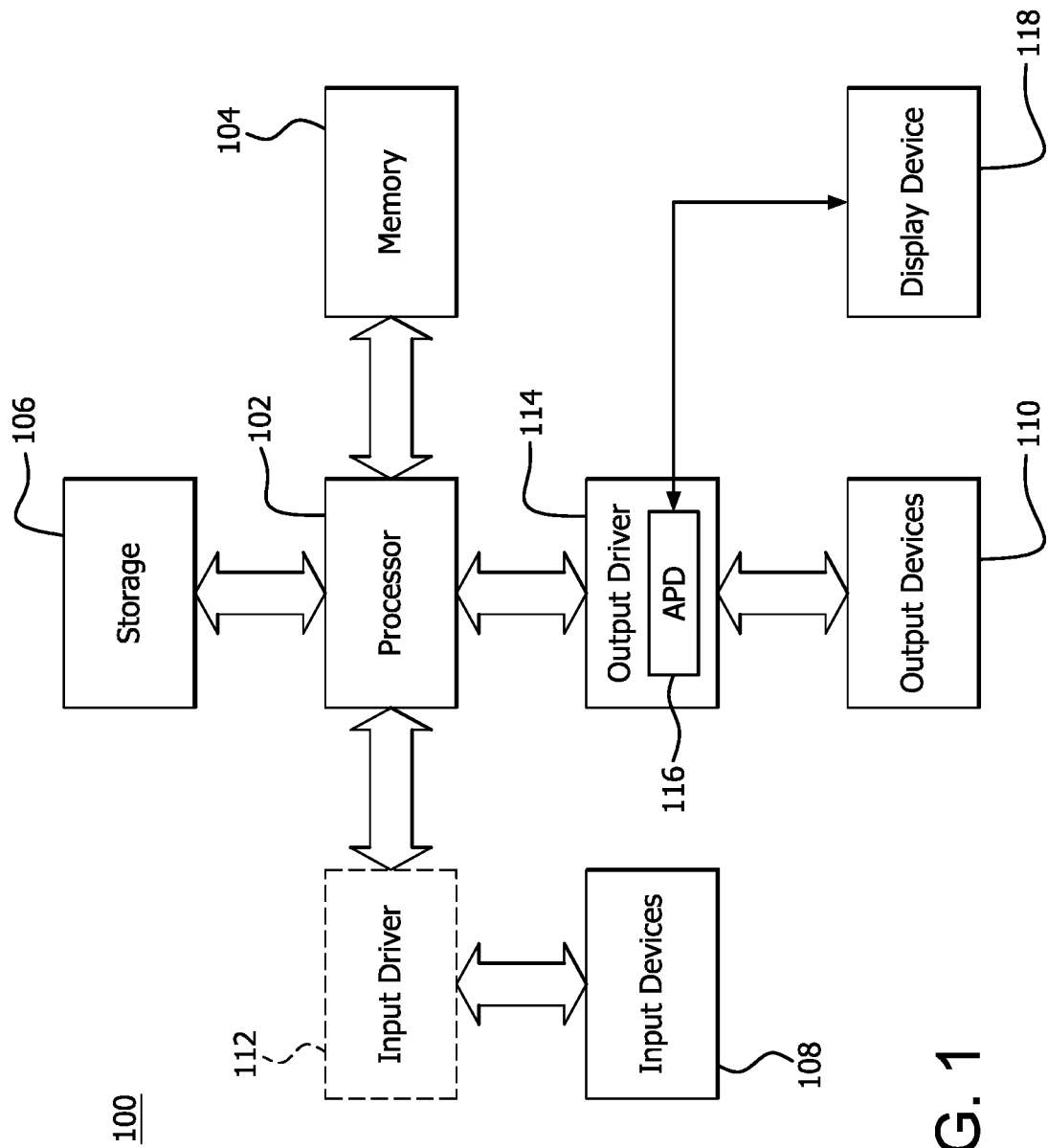
FIG. 1 is a block diagram of an example device in which one or more features of the disclosure can be implemented.

GPUs, in addition to CUs, include different level caches (e.g., level 1 cache (L1 cache) and level 2 cache (L2 cache)). Each CU includes an L1 cache and local data storage (LDS). The L1 cache and the LDS are shared among SIMD units of a CU. The L1 cache is part of the GPU memory, which also includes a level 2 cache (shared by other CUs) and main memory.

In some implementations, the L1 cache storage is managed by HW cache logic. The LDS storage is managed by the software kernel executing on the CU. Because the bandwidth between a CU and the L1 cache is greater than the bandwidth between a CU and other portions of memory (e.g., the L2 cache and main memory), the L1 cache is used to store frequently accessed data by the CUs. Likewise, the bandwidth between a CU and the LDS is relatively large to share data between SIMD units of CU. The L1 cache typically has a capacity ranging between 16 KB and 32 KB. The LDS typically has a fixed capacity (e.g., 64 KB or more) defined by standards (e.g., graphics standards) to which the GPU complies.

Increasing the capacity of the L1 cache allows the L1 cache to store more frequently accessed data. Both the L1 cache and the LDS, however, each occupy a silicon area in a CU. Accordingly, increasing the capacity of the L1 cache, to allow the L1 cache to store more frequently accessed data, also increases the area of the L1 cache in the GPU.

In some conventional accelerated processors, the data storages of the L1 cache and the LDS are shared between each other. For example, if it is determined that less storage space of the LDS is to be used, a portion (e.g., 16 KB) of the 64 KB of the LDS can be reserved for use by the LDS and the remaining portion of the 64 KB of the LDS can be used by the L1 cache to store more frequently accessed data. While these conventional accelerated processors allows the total area to be used more efficiently, some applications would benefit from the use of even more storage capacity of the L1 cache.

A portion (e.g., block of instructions) of a program is typically broken up into wavefronts, each of which include multiple work-items or threads which follow the same control-flow path. Register files are allocated to each SIMD unit of a CU and each wavefront in a block is scheduled and processed on the SIMD units of a CU, using the allocated register files. The size of the register file footprint per wavefront (i.e., the number of register allocated to process a wavefront) is determined, at compiling. When the register file footprint per wavefront is reduced, more waves can be processed in parallel, which can reduce the overall latency because more wavefronts can be scheduled and processed in parallel by a CU while other wavefronts being processed are waiting for data from memory (i.e., memory accesses). When the register file footprint per wavefront is increased, the overall number of memory accesses is reduced, but less wavefronts can be processed in parallel by a CU. At runtime, the wavefronts of the block are scheduled according to the determined register file footprint per wavefront and processed in parallel on different SIMD units of the CU or processed serially on the same SIMD unit.

The capacity of the register files of CUs range between 256 KB to 512 KB. That is, the capacity of the register files and their areas are larger than the capacities and areas of the L1 cache and the LDS. The storage of the register files is not easily shared, however, between different portions (e.g., wavefronts) of a program executing in the GPU and, in some cases, the register files are not fully occupied. For example, in conventional architecture, portions of the Static random access memory (SRAM) of the register files are not shared between SIMD units. Therefore, when execution of a program includes making data in the registers of a first SIMD unit available to a second SIMD unit, the first SIMD unit first pushes the data to the LDS 308, the L1 cache 306 or another portion of memory from which the data is then accessed by the second SIMD unit. Accordingly, the thread of a wavefront can indirectly access another thread of the same wavefront via memory (e.g., main memory), but with a larger latency period than accessing the data directly. The thread of a wavefront cannot, however, directly access another thread of the same wavefront via the register file.

Features of the present disclosure provide devices and methods for efficient processing of a program by sharing the combined storage of the L1 cache, the LDS and the register files. Portions of the SRAM of the register files, which are not shared by other SIMD units 138 in conventional architecture, are reserved for the L1 cache and the LDS and are shared between SIMD units of a CU. The amount or size of the portions of the register files which are reserved for the L1 cache and the LDS are based on an application to be executed. That is, the partitioning between the L1 cache, the LDS and the register files is tailored to a particular application to be executed. For example, when an application to be executed is determined to be an application which calls for a large L1 cache capacity but not a larger register file, a larger portion of the register files is reserved for use as additional L1 cache storage. Alternatively, when an application to be executed is determined to be an application which calls for a larger register file but not call for a large L1 cache capacity or LDS, a smaller portion or no portion of the register files is reserved for the L1 cache or the LDS.

An accelerated processing device is provided which comprises a plurality of compute units each including a plurality of SIMD units, and each SIMD unit comprises a register file. The accelerated processing device also comprises LDS in communication with each of the SIMD units. The accelerated processing device also comprises a first portion of cache memory, in communication with each of the SIMD units and a second cache portion of memory shared by the compute units. The compute units are configured to execute a program in which a storage portion of at least one of the register file of a SIMD unit, the first portion of cache memory and the LDS is reserved as part of another of the register file, the first portion of cache memory and the LDS.

A method of executing a program is provided which comprises executing a first portion of the program in a compute unit of an accelerated processing device using data in a first portion of a register file, storing data from the first portion of the register file to a second portion of the register file instantiated as part of a first level cache memory and reloading the data stored in the second portion of the register file to the first portion of the register file to execute a second portion of the program.

A processing device is provided which comprises an accelerated processing device. The accelerated processing device comprises memory and a plurality of compute units each including a plurality of SIMD units, and each SIMD unit comprises a register file. The accelerated processing device also comprises LDS in communication with each of the SIMD units. The accelerated processing device also comprises a cache memory comprising a first level in communication with each of the SIMD units and a second level shared between the compute units. The compute units are configured to execute a program in which a storage portion of at least one of the register file of a SIMD unit, the first level of cache memory, and the LDS is reserved as part of another of the register file, the first level of cache memory and the LDS.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a GPU, a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an APD 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a SIMD paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
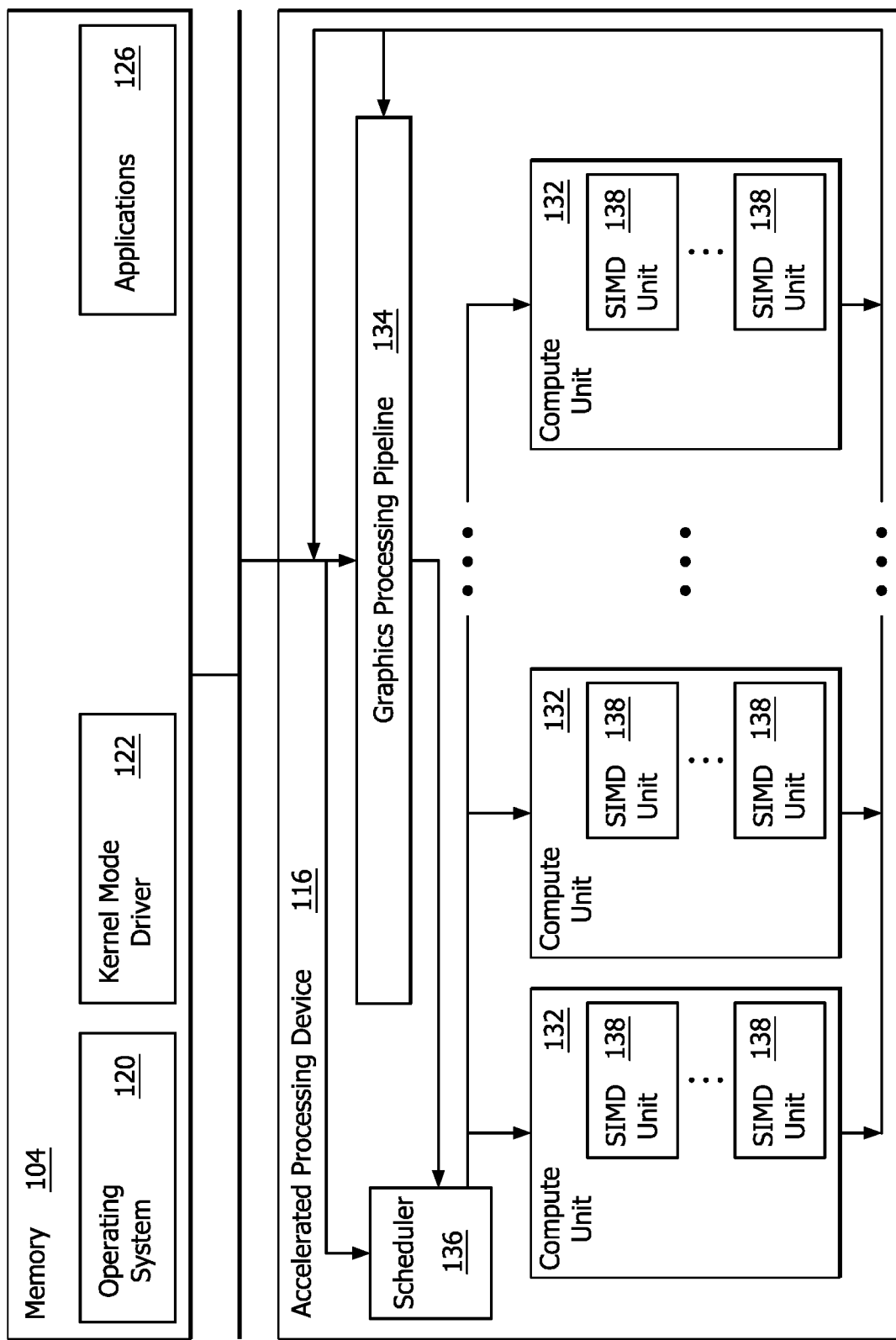
FIG. 2 is a block diagram illustrating example components for implementing one or more features of the disclosure.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations, as well as non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a wavefront on a single SIMD processing unit 138. One or more wavefronts are included in a work group, which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the normal operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As described in more detail below, the APD 116 is configured to share the combined storage of the L1 cache, the LDS and the register files. Portions of one or more of the memory blocks (i.e., the SRAM of the register file, the LDS and the L1 cache) are reserved (i.e., instantiated) for one or more of the other memory blocks based on an application to be executed. The partitioning between the L1 cache, the LDS and the register files is tailored to a particular use of the L1 cache, the LDS and the register files by application.

Figure 3:
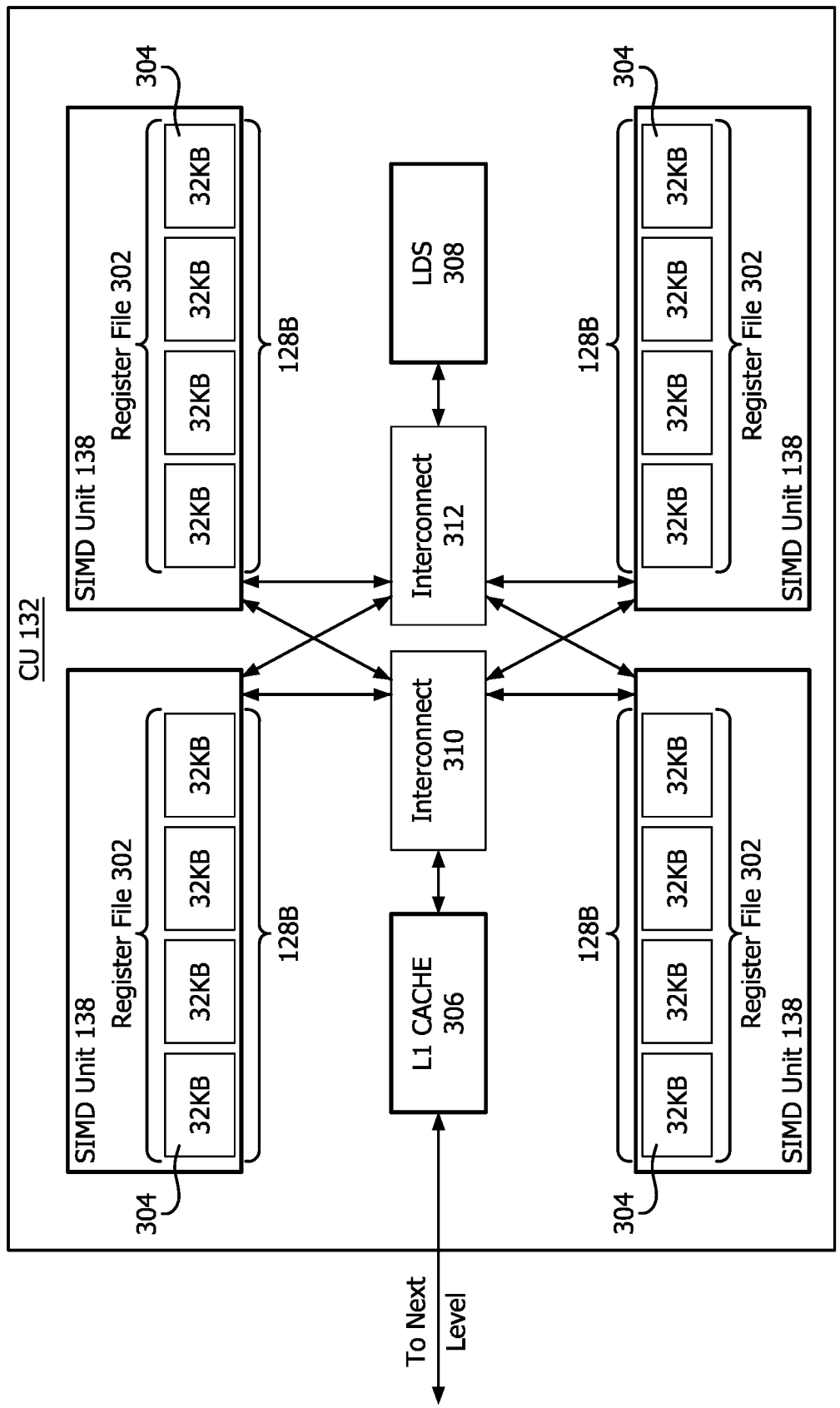
FIG. 3 is a block diagram illustrating example components of a CU of the APD shown in FIG. 2 for implementing one or more features of the present disclosure.

FIG. 3 is a block diagram illustrating example components of a CU 132 of the APD 116 shown in FIG. 2 for implementing one or more features of the present disclosure. For simplified explanation, the APD 116 is described as a GPU, which is an example of APD 116.

As shown in FIG. 3, each SIMD unit 138 of the compute unit 132 includes banks 304 of a register file 302. As shown in the example in FIG. 3, each register file 302 has 128 KB storage capacity and includes four banks 304 each having 32 KB storage capacity. The number of SIMD units and the number of banks of each register file shown in FIG. 3 is merely an example. Features of the disclosure can be implemented using CUs having any number of SIMD units and register files with any number of banks. In addition, the capacities of the register files and the banks shown in FIG. 3 are merely an example. Features of the disclosure can be implemented with capacities different from those shown in FIG. 3.

The CU 132 also includes an L1 cache 306 in communication with each of the 4 SIMD units 138 through interconnect 310 and in communication with the next level of memory (e.g., L2 cache, L3 cache, main memory) of the GPU. Accordingly, any SIMD unit 138 can request data from the L1 cache or any other portion of memory.

The LDS 308 is in communication with each of the 4 SIMD units 138 through use of interconnect 312 and is accessible by any of the SIMD units 138. and can share the data. Accordingly, any SIMD unit 138 can push data to the LDS 308 and another SIMD unit 138 can pull that data from the LDS 308. In contrast, in conventional architecture, the register files 302 of each SIMD unit 138 are private to each SIMD units 138 and are not shared by other SIMD units 138. Accordingly, if a SIMD unit 138 wants to make data available to another SIMD units 138, the SIMD unit 138 pushes the data to the LDS 308, the L1 cache 306 (or another portion of memory which will result in longer latency) to be accessible to the other SIMD unit 138.

Features of the present disclosure reserve portions of the SRAM of the register files, which are typically not shared by other SIMD units 138, for the L1 cache 306 through interconnect 310 and the LDS 308 through interconnect 312 and, therefore, sharable between SIMD units 138. The amount or size of the portions of the register files which are reserved for the L1 cache 306 and the LDS 308 are based on an application to be executed.

By sharing across the 3 hardware blocks, stored data is reused more efficiently for an application. When it is determined that an application uses more capacity and bandwidth of one of the memory blocks (i.e., L1 cache 306, LDS 308 and register files 302), portions of one or more of the other memory blocks are reserved for the one memory block. For example, when it is determined that an application uses more registers for execution, portions of the L1 cache 306 and/or the LDS 308 are reserved for the register files 302. When it is determined that an application uses more cache memory for execution, portions (e.g., one or more banks 304) of the register files 302 and/or the LDS 308 are reserved for use as additional L1 cache storage. When it is determined that an application uses more LDS capacity, portions (e.g., one or more banks 304) of the register files 302 and/or the L1 cache 306 are reserved for use as additional LDS storage. That is, the partitioning between the L1 cache 306, the LDS 308 and the register files 302 is tailored to a particular application to be executed.

Figure 4:
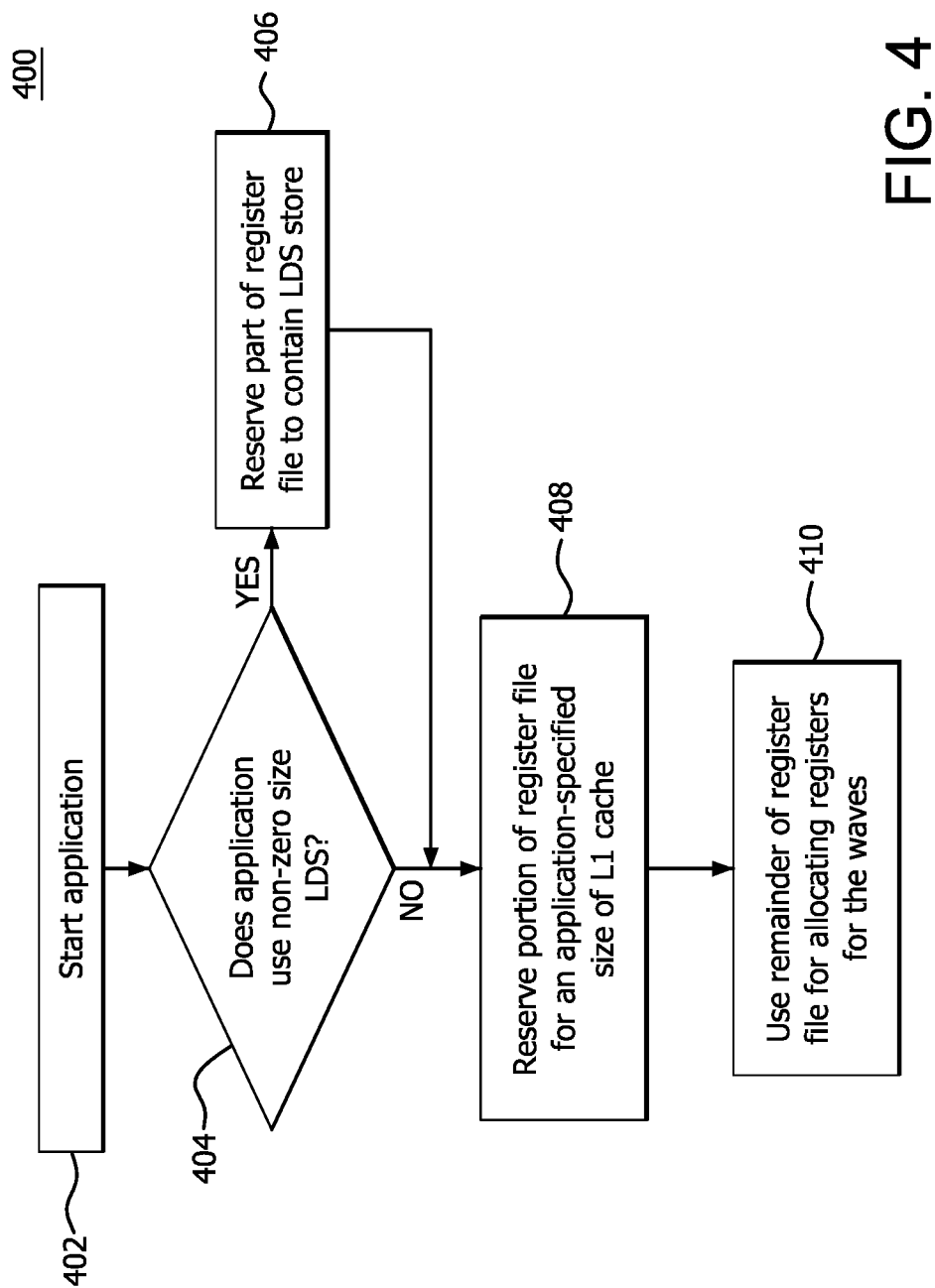
FIG. 4 is a flow diagram illustrating an example method of partitioning memory blocks for shared storage based on particular application according to features of the present disclosure.

FIG. 4 is a flow diagram illustrating an example method 400 of determining how to partition memory blocks for shared storage based on particular application. The example shown in FIG. 4 describes portions of a program as wavefronts. Features of the present disclosure can be implemented, however, by executing other types of portions of a program.

The example shown in FIG. 4 includes different determinations (i.e., decisions) for how to partition memory blocks based on a particular use case of an application to be executed. The order in which the decisions are made in FIG. 4 are merely an example. Features of the present disclosure can be implemented by making the decisions shown in FIG. 4 in an order different from the order shown in FIG. 4. It can also be appreciated that the decisions shown in FIG. 4 are not exhaustive and that other combinations of partitioning the memory blocks can be used to execute an application more efficiently.

As shown at block 402, the application begins executing. The application is, for example, an application which includes graphics operations, as well as non-graphics operations that is suited for parallel processing. When the application executes, the processing device (e.g., the CPU) determines how to partition the memory blocks (i.e., the register file, the L1 cache and LDS).

As shown at decision block 404, the method 400 includes determining whether the application uses a non-zero size LDS. When it is determined, at block 404, that a non-zero size LDS is used to execute the program (YES decision), a portion of the register file is reserved to contain the LDS store (i.e., to store data in the LDS) at block 406. Then, a portion of the register file is reserved for the L1 cache based on an L1 cache size specified by the application at block 408.

When it is determined, at block 404, that no LDS store is used to execute the application (NO decision), a portion of the register file is reserved for the L1 cache based on an L1 cache size specified by the application, at block 408, without reserving a portion of the register file to contain the LDS store. For example, when no LDS store is used to execute the application, a larger portion of the register file can be reserved for the L1 cache than when a non-zero size LDS is used to execute the program.

After a portion of the register file is reserved for the L1 cache at block 408, the remainder of the register file (i.e., registers not reserved for the L1 cache and/or the LDS store), is allocated to execute the waveforms at block 410.

The size of the portion of a register file (number of registers) reserved for the L1 cache and/or the LDS store is determined, for example, based on different factors, such as a capacity and bandwidth of the L1 cache and/or LDS.

Figure 5:
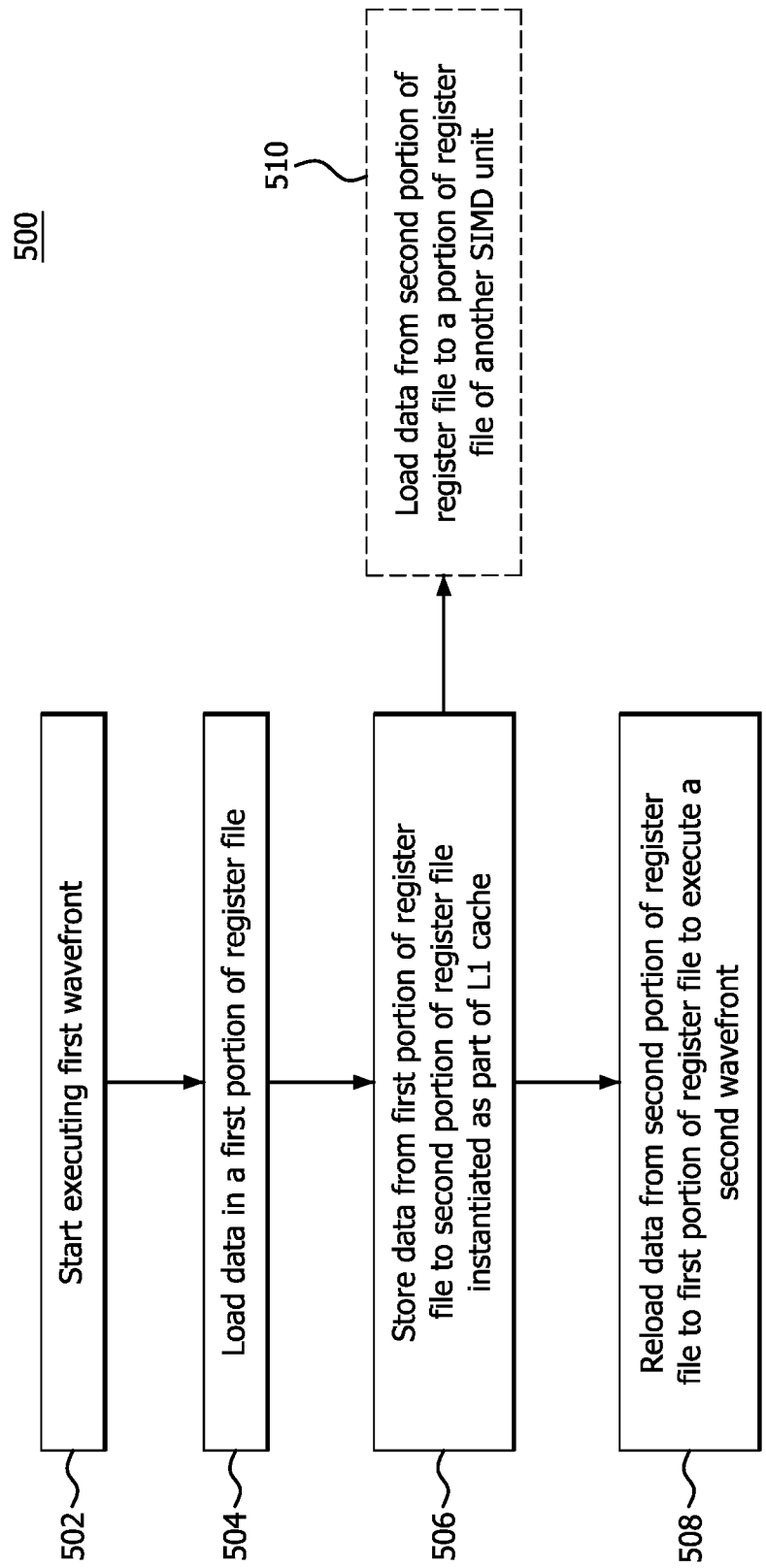
FIG. 5 is a flow diagram illustrating an example method of executing a program according to features of the present disclosure.

FIG. 5 is a flow diagram illustrating an example method 500 of executing a program according to features of the present disclosure. The method 500 shown in FIG. 5 is merely an example of executing a program according to features of the present disclosure when a decision is made to instantiate a portion of the register file of a CU as part of the L1 cache based on the particular application to be executed. It can be appreciated that other methods of executing a program can be performed similarly to the method shown in FIG. 5 when a different decision is made for how to partition the memory blocks to instantiate a portion of the register file of a CU as part of the L1 cache based on the particular application to be executed.

The example shown in FIG. 5 describes portions of a program as wavefronts. Features of the present disclosure can be implemented, however, by executing other types of portions of a program.

As shown at block 502, the method 500 includes starting the execution of a first wavefront. That is, the first wavefront is executed by one of the SIMD units 138 show in FIG. 3.

As shown at block 504, the method 500 includes loading data in a first portion of register file. That is, data is loaded in registers of one of the register files 302 shown in FIG. 3. For example, the data is used by ALUs (not shown) to perform calculations using the data loaded in the registers of the first portion of register file to execute the wavefront. As described above, in this example, a portion (i.e., a second portion) of the register file of a CU is instantiated as part of the L1 cache based on the particular application to be executed. For example, the application is determined to be an application which does not use a large register file for its execution. Accordingly, the application is executed by creating additional L1 cache capacity by the second portions of the register file.

As shown at block 506, the method 500 includes storing data from the first portion of register file to the second portion of register file instantiated (reserved) as part of the L1 cache. For example, the data is stored in the second portion of register file as part of a spill operation to free up space in the first portion of the register file to execute a second wavefront.

As shown at block 508, the method 500 includes reloading the data from the second portion of register file to the first portion of the register file to execute a second wavefront. The data reload includes a register to register transfer, which has a greater bandwidth than an L1 cache to register transfer and a much higher bandwidth than a L2 cache (or main memory) to register transfer. Accordingly, the latency is reduced.

Additionally or alternatively, the data in the second portion of register file can be loaded to a portion of the register file of another SIMD unit, as shown in phantom at block 510. That is, the second portion of the register file is instantiated as a portion of the L1 cache and is shared by other SIMD units of the CU. Accordingly, the data can be transferred between SIMD units of the same CU, which has a greater bandwidth than the transfers between registers and an L2 cache. Therefore, the application can be executed more efficiently without increasing the area occupied by the memory blocks.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, allocated registers 304 and register cache 306 of a register file 302 and ALUs 308 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An accelerated processing device comprising:
a plurality of compute units each comprising:
a plurality of single-instruction-multiple-data (SIMD) units each comprising a register file;
a cache memory that is accessible to each of the SIMD units; and
local data storage (LDS) that is accessible to each of the SIMD units,
wherein the compute units are configured to:
dynamically allocate a respective register file of one or more of the plurality of SIMD units between at least one of the cache memory and the LDS during execution of an application in response to a request to execute the application on the plurality of compute units.

2. The accelerated processing device of claim 1, wherein the respective register file is allocated when compiling the application.

3. The accelerated processing device of claim 1, wherein the accelerated processing device is a GPU.

4. The accelerated processing device of claim 1, wherein the register file comprises banks of registers.

5. The accelerated processing device of claim 1, wherein the cache memory includes a first portion that is shared amongst the plurality of SIMD units in a respective compute unit and a second portion that is shared amongst the plurality of compute units.

6. The accelerated processing device of claim 5, wherein the plurality of the compute units are configured to:
execute a first portion of the application using data stored in a reminder of the register file that is not allocated within a first SIMD from the plurality of SIMD;
store the data in the first portion of the cache memory; and
reload the data from the first portion of the cache memory to a register file of a second SIMD from the plurality SIMD in order to execute a second portion of the application.

7. The accelerated processing device of claim 6, wherein the first portion of the application and the second portion of the application are wavefronts.

8. The accelerated processing device of claim 6, wherein the register file of each of plurality of SIMD is formed using static random access memory (SRAM).

9. A system comprising:
memory; and
an accelerated processing device comprising:
a plurality of compute units each comprising:
a plurality of single-instruction-multiple-data (SIMD) units each comprising a register file;
a cache memory that is accessible to each of the SIMD units; and
local data storage (LDS) that is accessible to each of the SIMD units,
wherein the compute units are configured to:
dynamically allocate a respective register file of one or more of the plurality of SIMD units between at least one of the cache memory and the LDS during execution of an application in response to a request to execute the application on the plurality of compute units.

10. The system of claim 9, wherein the accelerated processing device is a GPU.

11. The system of claim 9, wherein the cache memory includes a first portion that is shared amongst the plurality of SIMD units in a respective compute unit and a second portion that is shared amongst the plurality of compute units.

12. The system of claim 11,
wherein the compute units are configured to:
execute a first portion of the application using data stored in a reminder of the register file that is not allocated within a first SIMD from the plurality of SIMD;
store the data in the first portion of the cache memory; and
reload the data from the first portion of the cache memory to a register file of a second SIMD from the plurality SIMD in order to execute a second portion of the application.

13. A method of operating an accelerated processing device, the method comprising:
analyzing an application that is requested to be executed by a plurality of compute units that comprise the accelerated processing device, wherein each of the plurality of compute units include a plurality of single-instruction-multiple-data (SIMD) units that each comprises a register file; and
dynamically allocating a respective register file of one or more of a plurality of SIMD units of a respective compute unit between at least one of a cache memory of the respective compute unit and a local data storage (LDS) of the respective compute unit in response the analyzing.

14. The method of claim 13, wherein the allocating is performed when compiling the application.

15. The method of claim 13, wherein the accelerated processing device is a GPU.

16. The method of claim 13, further comprising:
executing a first portion of the application using data stored in a reminder of the register file that is not allocated within a first SIMD from the plurality of SIMD of the respective compute unit;
storing the data in the first portion of the cache memory of the respective compute unit; and
reloading the data from the first portion of the cache memory to a register file of a second SIMD from the plurality SIMD of the respective compute unit in order to execute a second portion of the application.

* * * * *